(No Model.)
T. A. JEBB.
GRAPE SUGAR COMPOUND.
No. 264,036. Patented Sept. 5, 1882.
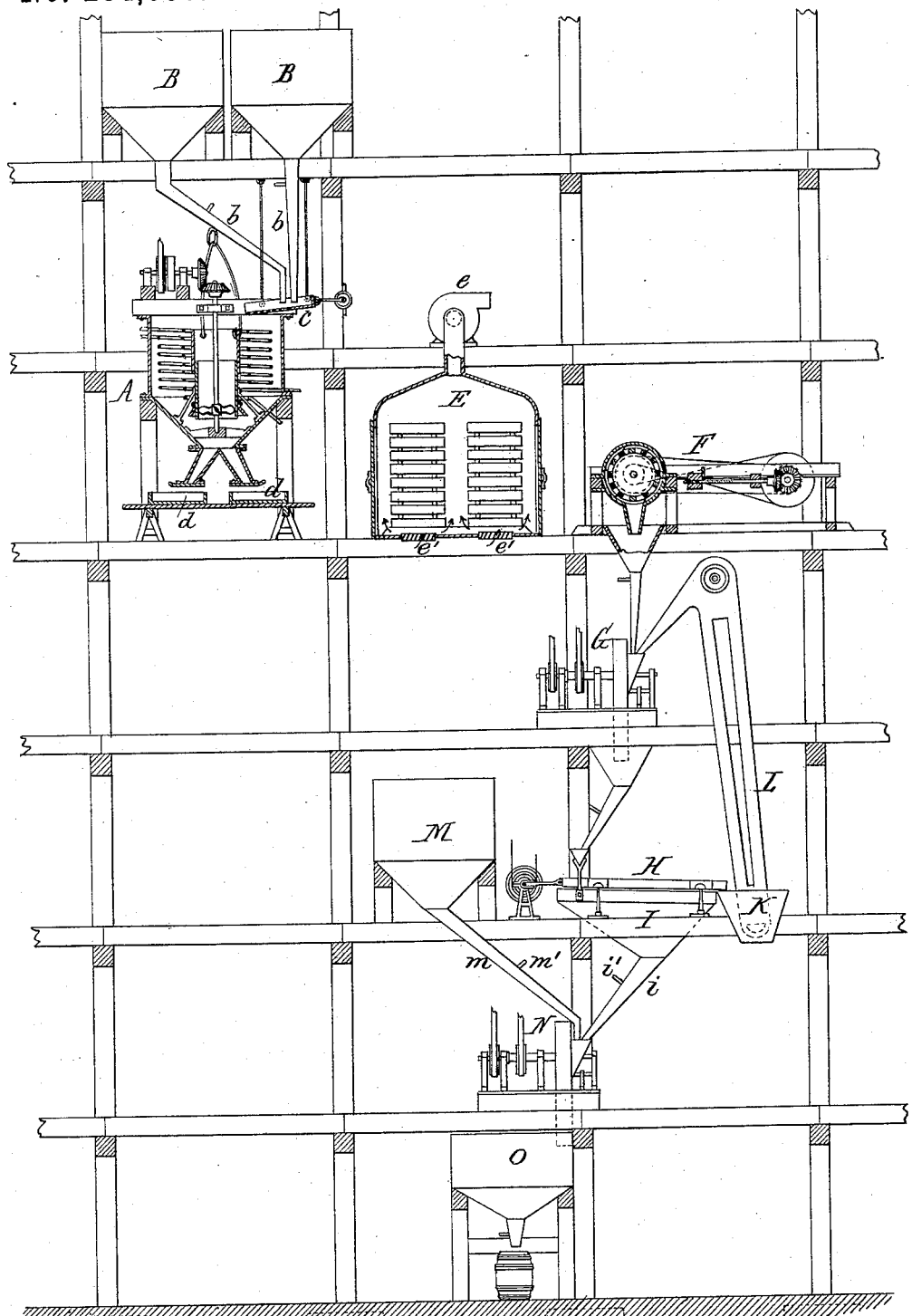
Witnesses:
chas. J. Buchheit
Edw. J. Brady
Thomas A. Jebb. Inventor.
By Wilhelm & Bonner.
Attorneys.

UNITED STATES PATENT OFFICE.

THOMAS A. JEBB, OF BUFFALO, NEW YORK.

GRAPE-SUGAR COMPOUND.

SPECIFICATION forming part of Letters Patent No. 264,636, dated September 5, 1882.

Application filed July 12, 1882. (No model.)

*To all whom it may concern:*

Be it known that I, THOMAS A. JEBB, of the city of Buffalo, in the county of Erie and State of New York, have invented new and useful Improvements in Grape-Sugar Compounds, of which the following is a specification.

This invention relates to the manufacture of saccharine compounds containing grape-sugar and cane-sugar or beet-sugar, and has for its object to produce a dry, hard, and homogeneous compound containing these ingredients.

My invention consists of a dry, hard, granular saccharine compound composed of grape-sugar and cane-sugar or beet-sugar, the ingredients being intimately mixed, as hereinafter set forth, thereby producing a solid compound in which the crystals or grains of cane or beet sugar are cemented together by the solidified grape-sugar, and which is adapted to be used as a substitute for cane or beet sugar for domestic and other purposes.

In practicing my invention the liquid grape-sugar, preferably in the condition in which it comes from the vacuum-pan or final filter, and possessing a gravity which causes it to become solid in a state of rest, is placed in a mixing apparatus of any suitable and well-known construction. If the liquid grape-sugar is not sufficiently cool, the mixing apparatus should be provided with a coil through which cold water flows, or some other cooling device. The liquid grape-sugar is agitated or caused to circulate in contact with the cooling-surface, whereby the grape-sugar is cooled off and prepared for solidification. Cane-sugar or beet-sugar in a granulated or pulverized form is mixed in the mixing apparatus with the grape-sugar, preferably after the latter has become cool and before it has become hard or set. Any of the well-known grades of cane-sugar or beet-sugar—such as granulated, powdered, or brown sugar—may be used for this purpose.

I prefer to mix cane or beet sugar with grape-sugar in equal quantities, or thereabout; but this proportion may be varied according to the demands of the trade and the use for which the compound is intended.

The cane-sugar or beet-suar and grape-sugar are thoroughly mixed in the mixing apparatus by a suitable stirring or circulating mechanism, whereby the cane or beet sugar and the grape-sugar are thoroughly incorporated each with the other, and caused to form a homogeneous compound.

When the mixture has assumed the consistency of thick cream it is drawn from the mixing apparatus into molds or pans and permitted to become hard or solid. This process is preferably expedited by placing the molds or pans in a chamber in or through which air is caused to circulate by means of a suction-pan or any other suitable device, and whereby the sugar is rapidly deprived of its heat and moisture.

When the sugar has become completely hard and solid it is taken out of the molds or pans, and either disposed of to the trade in this form, or it is ground, crushed, scraped, or shaved by means of any of the well-known grinding, scraping, or shaving machines, and disposed of to the trade in this form; or, after so being ground, scraped, or shaved, it may be mixed with an additional quantity of cane or beet sugar granulated or pulverized to a similar degree of fineness, as may be preferred.

The cane or beet sugar destroys the sticky or adhesive property of the grape-sugar, it renders the compound hard and dry, it hastens the solidification of the grape-sugar, and it reduces its tendency to absorb moisture from the atmosphere and ferment or turn sour.

An apparatus suitable for manufacturing my improved compound is illustrated in the accompanying drawing, in which—

A represents the mixing-machine, in which the liquid grape-sugar and cane or beet sugar are intimately mixed.

B represents two hoppers or bins containing pulverized or granulated cane or beet sugar, and provided with spouts $b$, leading to the mixing-machine A.

$c$ represents a shaking sieve or other suitable distributing mechanism, which receives the pulverized or granulated sugar from the spouts $b$ and sprinkles the same over the surface of the liquid grape-sugar in the mixing-machine A.

$d$ represents the molds into which the mixture is delivered from the mixing-machine A, and in which it becomes hard.

E represents a cooling-chamber, in which the molds containing the grape-sugar, or the blocks or bars of sugar formed in such molds, are placed for drying and hardening.

$e$ represents a suction-fan, which draws an air-current through the chamber E, the air entering through registers $e'$ in the floor of the chamber. Instead of a suction-fan, any other suitable air-circulating contrivance—such as blast-fans, air-pumps, or chimneys—may be employed, if preferred.

F represents the cutting or scraping machine upon which the blocks of sugar are reduced to fine shavings, and G represents a mill of any suitable construction, which receives the shavings produced by the scraping-machine F and reduces the same further to the desired degree of fineness. This mill may be a grinding-mill consisting of a pair of mill-stones, or a roller-mill or disintegrating-mill, or any other suitable reducing apparatus.

H represents a separating-machine, which receives the ground material and separates the coarse particles which have not been reduced to the proper degree of fineness from the fine particles. This separating-machine consists preferably of a flat vibrating sieve clothed with bolting-cloth of proper mesh to effect the desired separation; but a revolving or centrifugal reel may be employed, if preferred. The fine material passing through the meshes of the sieve falls into a hopper, I, while the coarse tailings fall into a receptacle, K, and are returned by an elevator, L, or other suitable mechanism to the mill G, where they are reground.

M represents a hopper, which contains pulverized cane or beet sugar, and N represents a mixing-machine, in which the pulverized or granulated cane or beet sugar is mixed with the fine material collected in the hopper I. The hoppers I and M are provided with spouts $i$ and $m$, respectively provided with slides or valves $i'$ $m'$, whereby the flow of material is regulated.

The mixing-machine N is preferably a disintegrating-mill provided with several rows of pins or beaters revolving in opposite directions at a suitable speed to thoroughly mix the material without further breaking up or reducing the same.

O represents the receiving-bin, into which the mixed material is discharged from the mixing-machine N, and from which it is delivered into barrels or packages, in which it is sold to the trade.

In my improved compound the grains or crystals of cane or beet sugar are not dissolved by the liquid grape-sugar, but are cemented together by the solidified grape-sugar, which latter fills the interstices between the grains or crystals of cane or beet sugar.

I am aware that heretofore it has been proposed to mix cane and grape sugar in the form of solutions or sirups, and to obtain the compound by crystallization out of the solution; also, that it has been proposed to add cane or beet sugar to a watery solution of grape-sugar immediately after conversion of the starch or dextrine into grape-sugar and before neutralizing the liquid; also, that it is not new to coat the grains of granulated cane-sugar with a solution of glucose for producing soft sugar.

I am also aware that it has been proposed to coat the surfaces of the crystals or grains of cane-sugar with a solution of glucose in lieu of white-liquor; so that when such crystals or grains are brought together they will be cemented together at their points of contact; but in such treatment the mass produced by subsequent molding, pressing, and drying consists substantially of cane-sugar with but a slight admixture of glucose, and although homogeneous in one sense is nevertheless porous.

The distinguishing characteristic of my improved compound is that the grape-sugar which is mixed with the crystals or grains of cane or beet sugar is of such a character and used in such proportion as to not only firmly unite the crystals or grains of cane or beet sugar, but to completely fill the interstices between the same, so that the product will be a concrete solid compound of grape-sugar and cane or beet sugar.

I claim as my invention—

The herein-described solid and dry saccharine compound composed of grains or crystals of cane-sugar or beet-sugar and solidified grape-sugar, the latter being of such character and employed in such proportion as to completely fill the interstices between the grains or crystals of cane or beet sugar and cement said grains or crystals together, the whole forming a solid concrete compound of grape-sugar and cane or beet sugar, substantially as set forth.

T. A. JEBB.

Witnesses:
 JNO. J. BONNER,
 CHAS. F. GEYER.